US012344378B1

(12) United States Patent
Celest

(10) Patent No.: US 12,344,378 B1
(45) Date of Patent: Jul. 1, 2025

(54) WATER-SCOOPING PROBE

(71) Applicant: Frederick Celest, Henderson, NV (US)

(72) Inventor: Frederick Celest, Henderson, NV (US)

(*) Notice: Subject to any disclaimer, the term of this patent is extended or adjusted under 35 U.S.C. 154(b) by 0 days.

(21) Appl. No.: 18/935,230

(22) Filed: Nov. 1, 2024

(51) Int. Cl.
*B64D 1/22* (2006.01)
*A62C 3/02* (2006.01)
*B64D 1/16* (2006.01)

(52) U.S. Cl.
CPC .............. *B64D 1/22* (2013.01); *A62C 3/0228* (2013.01); *B64D 1/16* (2013.01)

(58) Field of Classification Search
CPC .......... B64D 1/16; B64D 1/22; A62C 3/0228; A62C 3/0235
See application file for complete search history.

(56) References Cited

U.S. PATENT DOCUMENTS

| | | | |
|---|---|---|---|
| 6,874,734 B2 * | 4/2005 | Ramage | A62C 3/0228 169/53 |
| 9,957,047 B2 * | 5/2018 | Benedik | B64D 1/22 |
| 11,365,004 B1 * | 6/2022 | Celest | A62C 3/0228 |
| 2018/0002019 A1 * | 1/2018 | Benedik | B64D 1/22 |
| 2025/0058875 A1 * | 2/2025 | Von Mohos | B64D 1/22 |

FOREIGN PATENT DOCUMENTS

| | | | | |
|---|---|---|---|---|
| GB | 2163710 A | * | 3/1986 | ............... B64D 1/22 |
| WO | WO-2018165699 A1 | * | 9/2018 | |

* cited by examiner

*Primary Examiner* — Joshua J Michener
*Assistant Examiner* — Colin Zohoor
(74) *Attorney, Agent, or Firm* — QuickPatents; Kevin Prince

(57) ABSTRACT

An expandable probe for filling a water tank in an aircraft from a body of water includes an inflatable hose having a proximal end fixed with a housing in the aircraft, a distal end fixed with a scooping head, an elastomeric internal conduit, and an inflatable bladder substantially surrounding the conduit. The conduit has a proximal end in communication with the water tank of the aircraft and a distal end fixed with a water scoop of the scooping head. An air supply is adapted to inflate and extend the inflatable hose to an extended configuration extending outside an open rear end of the housing below the lower side of the aircraft. Lowering the aircraft allows the scooping head to contact the body of water such that water enters the scoop and travels up the conduit to the water tank.

6 Claims, 5 Drawing Sheets

WATER-SCOOPING PROBE

CROSS REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

The present invention relates to aerial firefighting equipment, and more particularly to an inflatable water scooping probe for fixed-wing aircraft.

BACKGROUND

Firefighting water collecting devices exist mainly for helicopters. Some have tried to adapt them to fixed-wing aircraft but these systems prove inadequate and simply do not work at the high speeds airplanes require, greater than 100 knots. Telescoping metal tubes are too heavy, too cumbersome, and can break or bend under high speed when impacting a water surface; flexible hoses trail into the relative wind and bounce on the water surface which becomes 'hard' at high speed.

As a fixed-wing plane loses considerable amount of time returning to an airport to reload, it is much more efficient fighting a fire when the plane can scoop water. Water scoopers, fixed-wing planes that collect water by scooping the water surface with a scoop attached to the airframe or pontoons, must contact the water surface with their fuselage or pontoons. This presents several problems:

1. It is dangerous for the plane to touch the water because of potential submerged objects, sand bars and swell that can cause damage to the plane.
2. The fuselage becomes 'contaminated' by the body of water and cannot scoop into another separate body of water, as it would contaminate the next body of water. The EPA (Environmental Protection Agency) forbids scoopers from contacting more than one body of water without thoroughly washing the plane first on the ground at an airport.
3. Aircraft design for scoopers is a 'boat' design or the plane must be fitted with floating pontoons which causes significant aerodynamic drag, adds considerable weight, and hence is less efficient and more fuel is used. If not a boat design, the plane is fitted with pontoons which makes the plane even slower, heavy and dangerous on water.

My prior U.S. Pat. No. 11,365,004 addressed some of these issues by introducing an inflatable water scooping probe. However, there remained room for improvement in areas such as the probe's stability in water, its efficiency in scooping water at high speeds, and its ability to reduce friction and drag during operation.

Therefore, there is a need for a device that allows a fixed-wing aircraft to efficiently scoop water from a body of water to fill a water tank for firefighting. Such a needed invention would reduce the hazard of collecting water to the aircraft and would be easy to deploy and retract. The device should be capable of operating at the high speeds required by fixed-wing aircraft, typically greater than 100 knots, without breaking or bending upon water impact. It should also minimize drag both in flight and while scooping water. Ideally, the device would not require the aircraft's fuselage or pontoons to contact the water surface, thus avoiding contamination issues and the need for specialized aircraft designs. Additionally, the invention should provide stability during water collection and incorporate features to enhance water intake efficiency. Such a device would significantly improve the capabilities of aerial firefighting operations, allowing for faster and more frequent water collection without the need to return to an airport for reloading. The present invention accomplishes these objectives.

SUMMARY OF THE INVENTION

The present device is an expandable probe for filling a water tank in an aircraft while flying over a body of water. The probe comprises an inflatable hose with a proximal end fixed to a housing in the aircraft and a distal end attached to a scooping head. The inflatable hose consists of an internal elastomeric conduit surrounded by an inflatable bladder. An air supply is connected to the inflatable bladder to extend the hose from a retracted configuration within the housing to an extended configuration below the aircraft.

The scooping head is designed to be aquadynamic and includes a front opening to collect water, an internal canal connecting to the elastomeric conduit, a pointed nose, and at least one cavitation generator. These features are configured to induce a super-cavitation effect, reducing friction when the scooping head is submerged and moving in water. A stabilizing drag-inducing cone is attached to the scooping head by a short cable.

The scooping head may incorporate additional features to enhance cavitation, such as sharp grooves on the pointed nose or air release holes connected to the inflatable bladder. A cable may be embedded within the inflatable bladder to strengthen its structure and assist with retraction. The inflatable bladder can have a symmetrical airfoil shape when inflated to reduce aerodynamic drag.

When deployed, the inflatable hose extends downward from the aircraft, submerging the scooping head in the water. Water enters the front opening of the scooping head, travels through the internal canal and up the elastomeric conduit to the water tank in the aircraft. This system allows for efficient water collection for firefighting or other purposes without the need for the aircraft to land on the body of water.

The present invention addresses the drawbacks of the prior art by providing a device that allows a fixed-wing aircraft to efficiently scoop water from a body of water to fill a water tank for firefighting. This invention reduces the hazard of collecting water to the aircraft and is easy to deploy and retract. The present device is capable of operating at the high speeds required by fixed-wing aircraft, typically greater than 100 knots, without breaking or bending upon water impact. It minimizes drag both in flight and while scooping water. Importantly, the invention does not require the aircraft's fuselage or pontoons to contact the water surface, thus avoiding contamination issues and the need for specialized aircraft designs. The device provides stability during water collection and incorporates features to enhance water intake efficiency. This invention significantly improves the capabilities of aerial firefighting operations, allowing for faster and more frequent water collection without the need to return to an airport for reloading. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
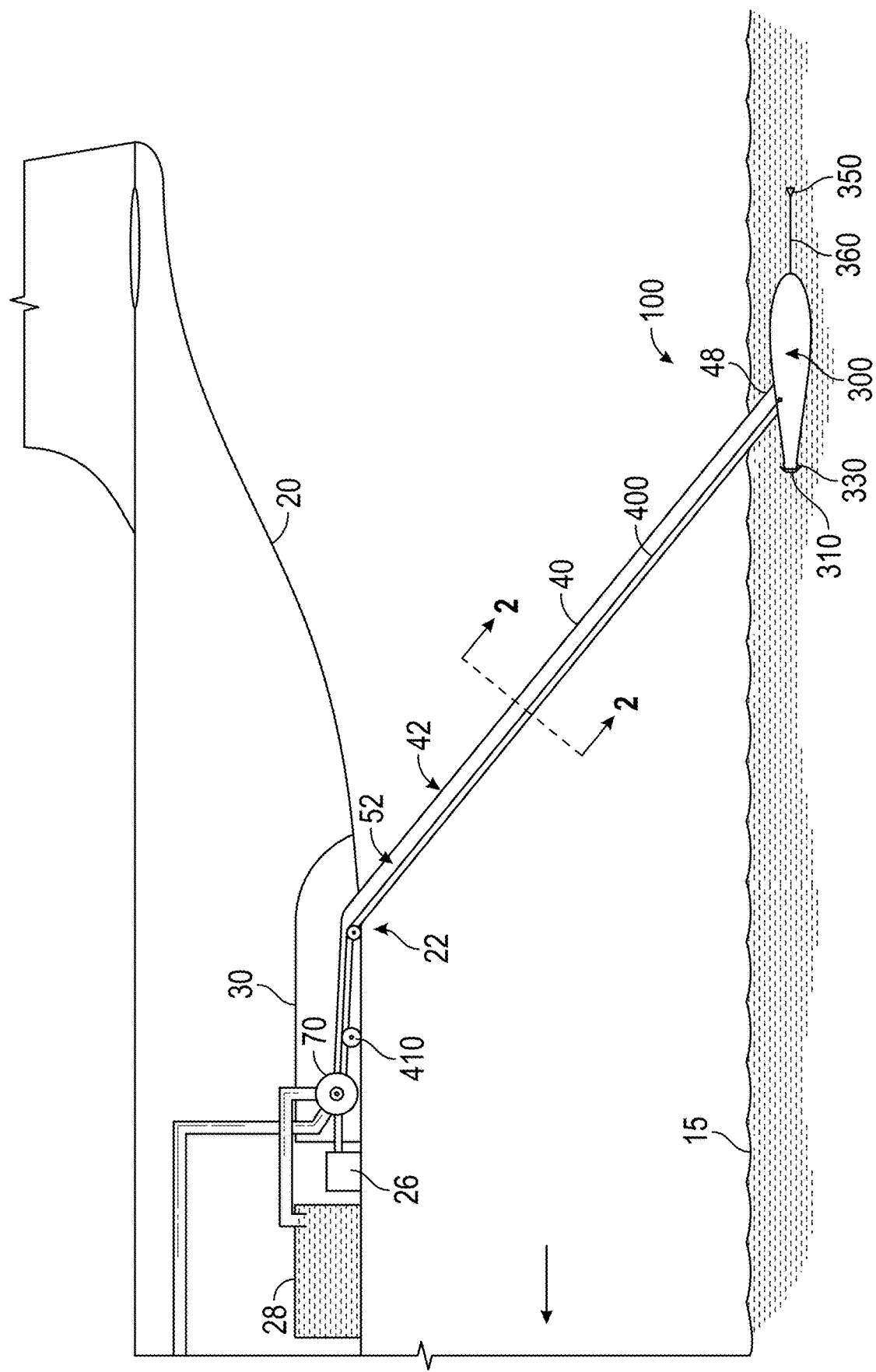
FIG. 1 is a side elevational diagram of the invention as deployed from an aircraft into a body of water.
Figure 2:
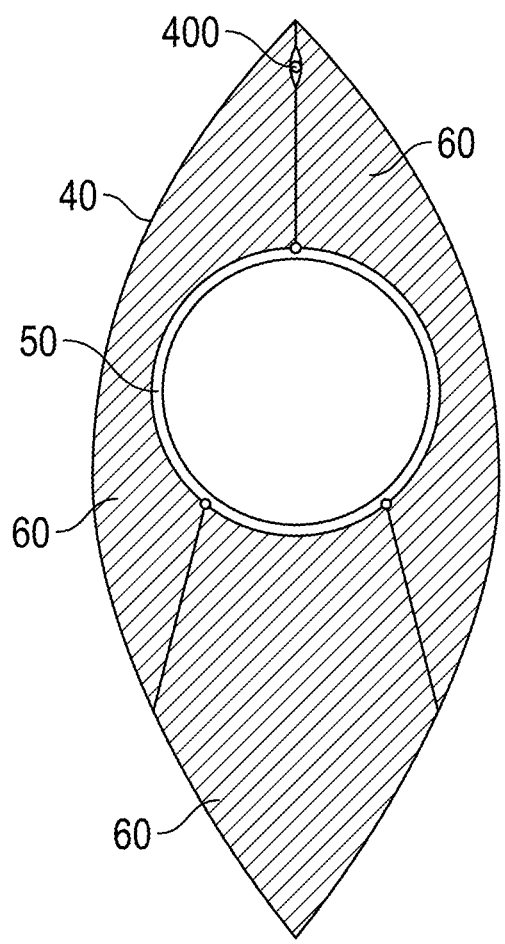
FIG. 2 is a cross-sectional view of an inflatable hose of the invention, taken along line 2-2 of FIG. 1.
Figure 3:
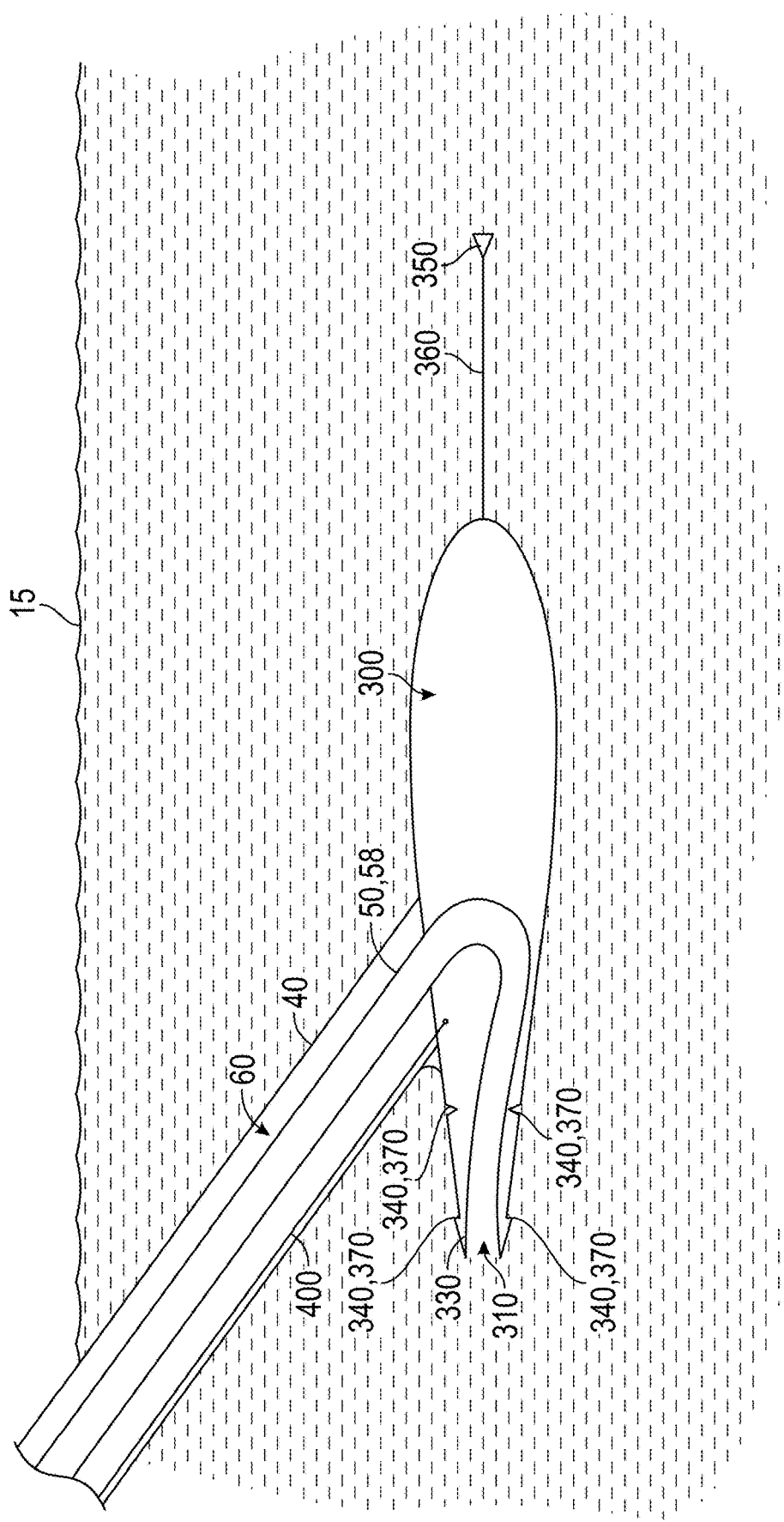
FIG. 3 is an enlarged side cross-sectional view of a water-dynamic scooping head and a stabilizing drag-inducing cone.

FIGS. 1-3 illustrate an expandable probe 10 for filling a water tank 28 in an aircraft 20 while flying over a body of water 15. The aircraft 20 has a lower side 22 and at least a power source 26. The expandable probe 10 comprises an inflatable hose 40 having a proximal end 42 fixed with a housing 30 in the aircraft 20, a distal end 48, an internal elastomeric conduit 50, and an inflatable bladder 60 substantially surrounding the internal elastomeric conduit 50. The internal conduit 50 has a proximal end 52 in communication with the water tank 28 of the aircraft 20 and a distal end 58. The inflatable hose 40 may be made of materials such as reinforced rubber, flexible polymers, or the like.

An air supply 70 is in selective fluid communication with the inflatable bladder 60 of the inflatable hose 40, and adapted to extend the inflatable hose 40 by inflating the inflatable bladder 60 from a retracted configuration (not shown) to an extended configuration 100. Such an air supply 70 may be a pressurized tank, an air compressor, or the like.

An elongated, aquadynamic scooping head 300 is fixed with the distal end 48 of the inflatable hose 40. The scooping head 300 comprises a front opening 310 to collect water, an internal canal 320 connecting the front opening 310 to the distal end 58 of the internal elastomeric conduit 50, a pointed nose 330, and at least one cavitation generator 340. The scooping head 300 may be constructed from materials such as stainless steel, titanium, high-strength polymers, or the like.

Figure 4:
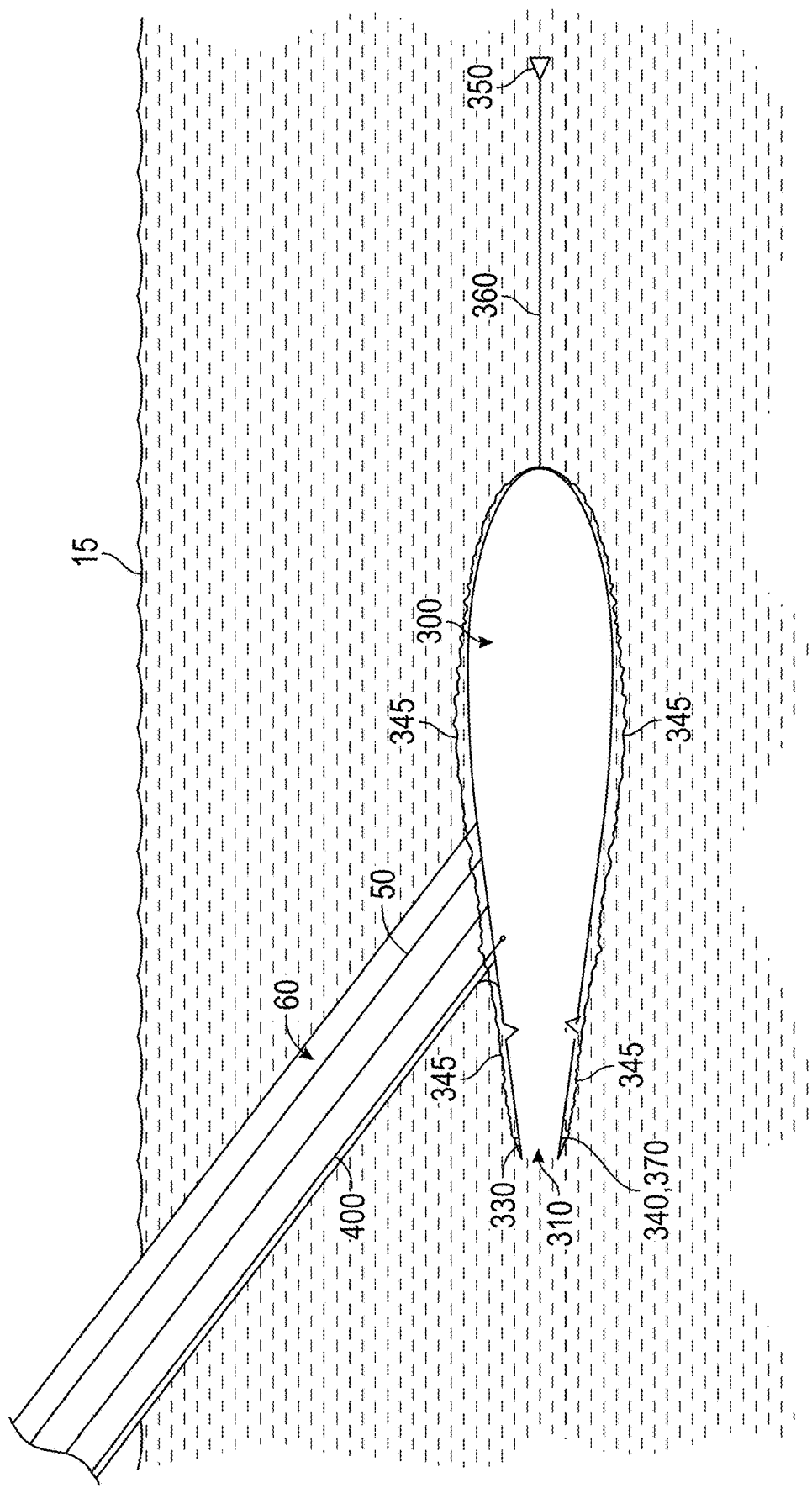
FIG. 4 is a side view of one embodiment of the water-dynamic scooping head that produces supercavitation around the water-dynamic scooping head when in use.

The pointed nose 330 and the at least one cavitation generator 340 are configured to induce a super-cavitation effect, creating an air bubble 345 (FIG. 4) that envelopes the scooping head 300 to reduce friction when the scooping head 300 is submerged and moving in the body of water 15. A stabilizing drag-inducing cone 350 is attached to the scooping head 300 by a short cable 360. Such a stabilizing drag-inducing cone 350 may be made of materials like reinforced fabric, rigid plastics, or the like.

The pointed nose 330 may include one or more sharp grooves 370 (FIG. 4) configured to induce additional cavitation when the scooping head 300 is submerged in the body of water 15, thereby further reducing friction between the scooping head 300 and the water. Such sharp grooves 370 may be machined, molded, or otherwise formed in the surface of the pointed nose 330.

Figure 5:
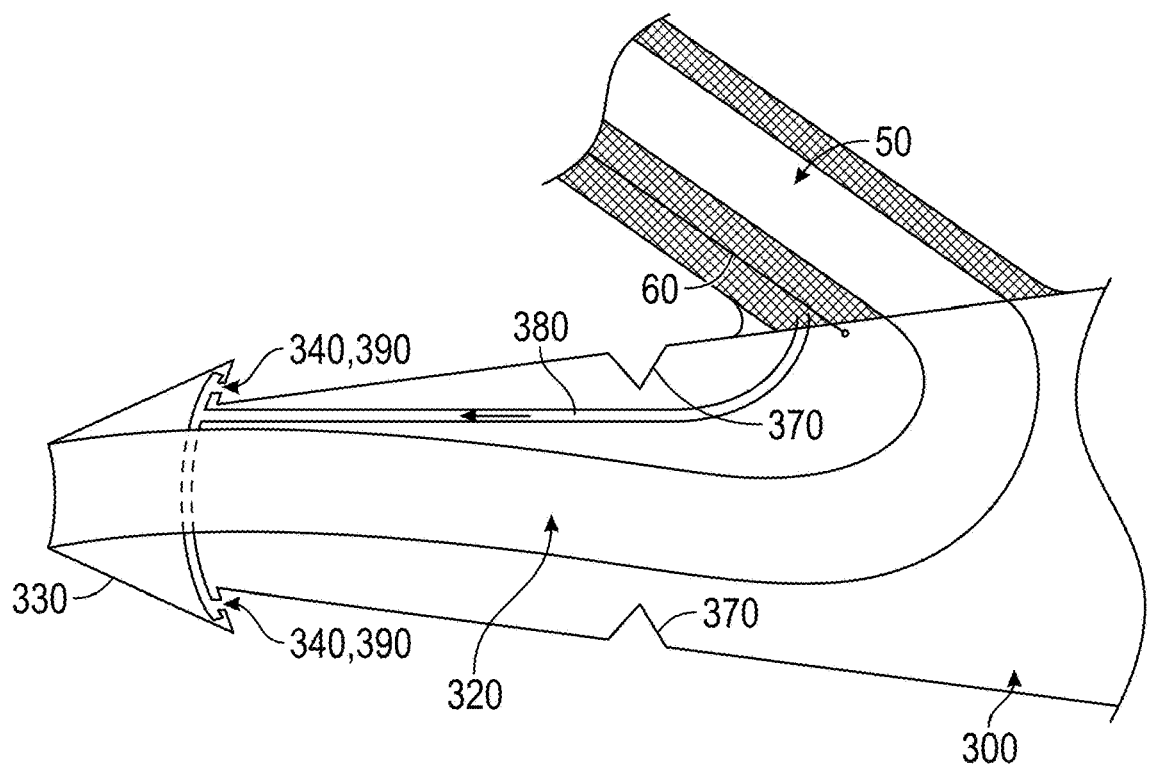
FIG. 5 is an enlarged side cross-sectional view another embodiment of the water-dynamic scooping head that uses pressurized air to induce supercavitation.
Figure 6:
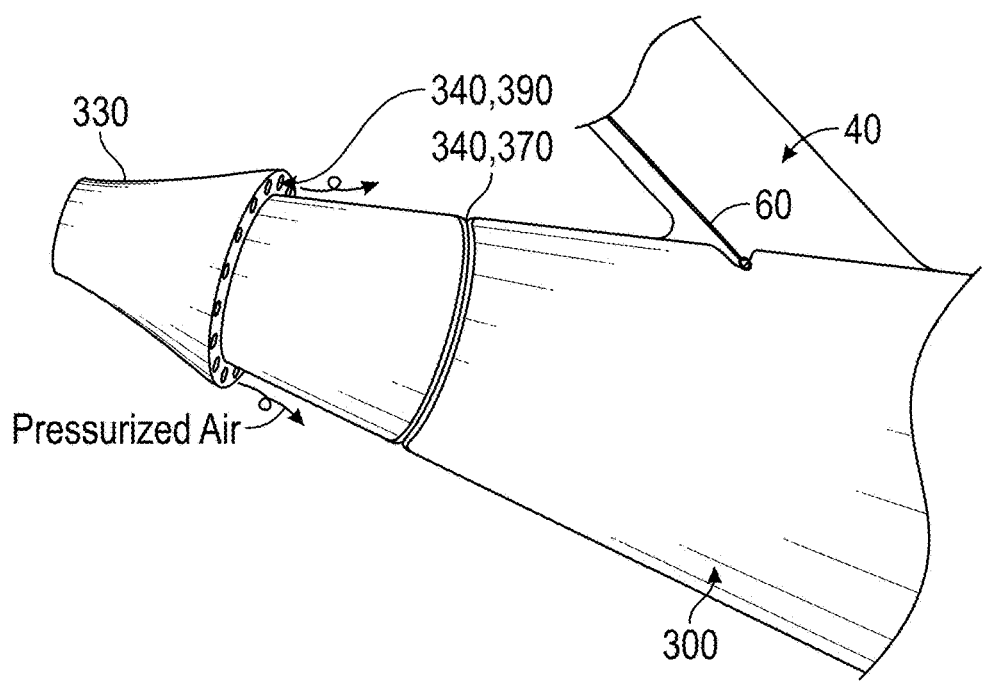
FIG. 6 is a side elevational view of the embodiment of FIG. 6.

Alternately, or additionally, a plurality of air release holes 390 (FIGS. 5 and 6) may be formed in the pointed nose 330 of the scooping head 300 and in fluid communication with the inflatable bladder 60 through an air conduit 380. In this configuration, the air supply 70 is further adapted to deliver pressurized air through the inflatable bladder 60 and out of the air release holes 390 to enhance the formation of the super-cavitation effect around the scooping head 300 when submerged in the body of water 15, thereby further reducing friction between the scooping head 300 and the water.

A cable 400 may be disposed within a core of the inflatable bladder 60, the cable 400 extending along a length of the inflatable hose 40. A cable reel 410 may be fixed within the housing 30 and connected to a proximal end of the cable 400. Such a cable 400 is configured to strengthen the structure of the inflatable bladder 60, and the cable reel 410 is adapted to assist with retraction of the cable 400 and the inflatable hose 40 into the housing 30 when the inflatable bladder 60 is deflated. The cable 400 may be made of materials such as steel wire, Kevlar, carbon fiber, or the like.

As illustrated in FIG. 2, the inflatable bladder 60 may have a symmetrical airfoil shape in cross-section when inflated, thereby reducing aerodynamic drag when the inflatable hose 40 is in the extended configuration 100. Such a symmetrical airfoil shape may be achieved through careful design of the inflatable bladder 60 structure and inflation characteristics.

The inflatable bladder 60 may be made with an expandable drop-stitch material that includes two carbon fiber woven fabric layers having a plurality of nylon strings stretched between two inner surfaces of each carbon fiber woven fabric layer, two air-tight layers being adhered to outer surfaces of each carbon fiber woven fabric layer. Alternatively, the inflatable bladder 60 may be constructed using other suitable materials such as reinforced elastomers, multi-layer composites, or the like.

When the air supply 70 inflates the inflatable bladder 60, the inflatable hose 40 extends downwardly below the aircraft 20 to submerge the scooping head 300 in the body of water 15, allowing water to enter the front opening 310, travel through the internal canal 320 and up the internal elastomeric conduit 50 to the water tank 28. This process enables efficient water collection for firefighting or other purposes without the need for the aircraft 20 to land on the body of water 15.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An expandable probe for filling a water tank in an aircraft while flying over a body of water, the aircraft having a lower side and at least a power source, comprising: an inflatable hose having a proximal end fixed with a housing in the aircraft, a distal end, an internal elastomeric conduit, and an inflatable bladder substantially surrounding the internal elastomeric conduit; the internal conduit having a proximal end in communication with the water tank of the aircraft and a distal end; an air supply in selective fluid communication with the inflatable bladder of the inflatable hose, and adapted to extend the inflatable hose by inflating the inflatable bladder from a retracted configuration to an extended configuration; an elongated, aquadynamic scooping head fixed with the distal end of the inflatable hose, the scooping head comprising: a front opening to collect water; an internal canal connecting the front opening to the distal end of the internal elastomeric conduit; a pointed nose; and at least one cavitation generator; wherein the pointed nose and the at least one cavitation generator are configured to induce a super-cavitation effect, creating an air bubble that envelopes the scooping head to reduce friction when the scooping head is submerged in the body of water; and a stabilizing drag-inducing cone attached to the scooping head by a short cable; whereby when the air supply inflates the inflatable bladder, the inflatable hose extends downwardly below the aircraft to submerge the scooping head in the body of water, allowing water to enter the front opening, travel through the internal canal and up the internal elastomeric conduit to the water tank; and
a cable disposed within a core of the inflatable bladder, the cable extending along a length of the inflatable hose; and a cable reel fixed within the housing and connected to a proximal end of the cable; wherein the cable is configured to strengthen the structure of the inflatable bladder, and the cable reel is adapted to assist with retraction of the cable and the inflatable hose into the housing when the inflatable bladder is deflated.

2. The expandable probe of claim 1, wherein the pointed nose includes one or more sharp grooves configured to induce additional cavitation when the scooping head is submerged in the body of water, thereby further reducing friction between the scooping head and the water.

3. The expandable probe of claim 1, further comprising:
a plurality of air release holes formed in the pointed nose of the scooping head and in fluid communication with the inflatable bladder;
wherein the air supply is further adapted to deliver pressurized air through the inflatable bladder and out of the air release holes to enhance the formation of the super-cavitation effect around the scooping head when submerged in the body of water, thereby further reducing friction between the scooping head and the water.

4. The expandable probe of claim 1 wherein the inflatable bladder has a symmetrical airfoil shape in cross-section when inflated, thereby reducing aerodynamic drag when the inflatable hose is in the extended configuration.

5. The expandable probe of claim 1, wherein the inflatable bladder is made with an expandable drop-stitch material that includes two carbon fiber woven fabric layers having a plurality of nylon strings stretched between two inner surfaces of each carbon fiber oven fabric layer, two air-tight layers being adhered to outer surfaces of each carbon fiber woven fabric layer.

6. An expandable probe for filling a water tank in an aircraft while flying over a body of water, the aircraft having a lower side and at least a power source, comprising:
an inflatable hose having a proximal end fixed with a housing in the aircraft, a distal end, an internal elastomeric conduit, and an inflatable bladder substantially surrounding the internal elastomeric conduit; the internal conduit having a proximal end in communication with the water tank of the aircraft and a distal end;

an air supply in selective fluid communication with the inflatable bladder of the inflatable hose;
an elongated, aquadynamic scooping head fixed with the distal end of the inflatable hose, the scooping head comprising:
   a front opening to collect water;
   an internal canal connecting the front opening to the distal end of the internal elastomeric conduit;
   a pointed nose including one or more sharp grooves;
   at least one cavitation generator; and
   a plurality of air release holes formed in the pointed nose;
a stabilizing drag-inducing cone attached to the scooping head by a short cable;
a cable disposed within a core of the inflatable bladder, the cable extending along a length of the inflatable hose;
a cable reel fixed within the housing and connected to a proximal end of the cable;
wherein the inflatable bladder is made with an expandable drop-stitch material that includes two carbon fiber woven fabric layers having a plurality of nylon strings stretched between two inner surfaces of each carbon fiber woven fabric layer, two air-tight layers being adhered to outer surfaces of each carbon fiber woven fabric layer;
wherein the inflatable bladder has a symmetrical airfoil shape in cross-section when inflated;
wherein the pointed nose and the at least one cavitation generator are configured to induce a super-cavitation effect, creating an air bubble that envelopes the scooping head to reduce friction when the scooping head is submerged in the body of water;
wherein the one or more sharp grooves are configured to induce additional cavitation when the scooping head is submerged in the body of water, thereby further reducing friction between the scooping head and the water;
wherein the air supply is adapted to extend the inflatable hose by inflating the inflatable bladder from a retracted configuration to an extended configuration, and to deliver pressurized air through the inflatable bladder and out of the air release holes to enhance the formation of the super-cavitation effect;
wherein the cable is configured to strengthen the structure of the inflatable bladder, and the cable reel is adapted to assist with retraction of the cable and the inflatable hose into the housing when the inflatable bladder is deflated;
wherein the symmetrical airfoil shape of the inflatable bladder reduces aerodynamic drag when the inflatable hose is in the extended configuration; and
whereby when the air supply inflates the inflatable bladder, the inflatable hose extends downwardly below the aircraft to submerge the scooping head in the body of water, allowing water to enter the front opening, travel through the internal canal and up the internal elastomeric conduit to the water tank.

\* \* \* \* \*